May 13, 1958     S. C. KISIEL ET AL     2,834,145
MINNOW BUCKET
Filed Aug. 16, 1956
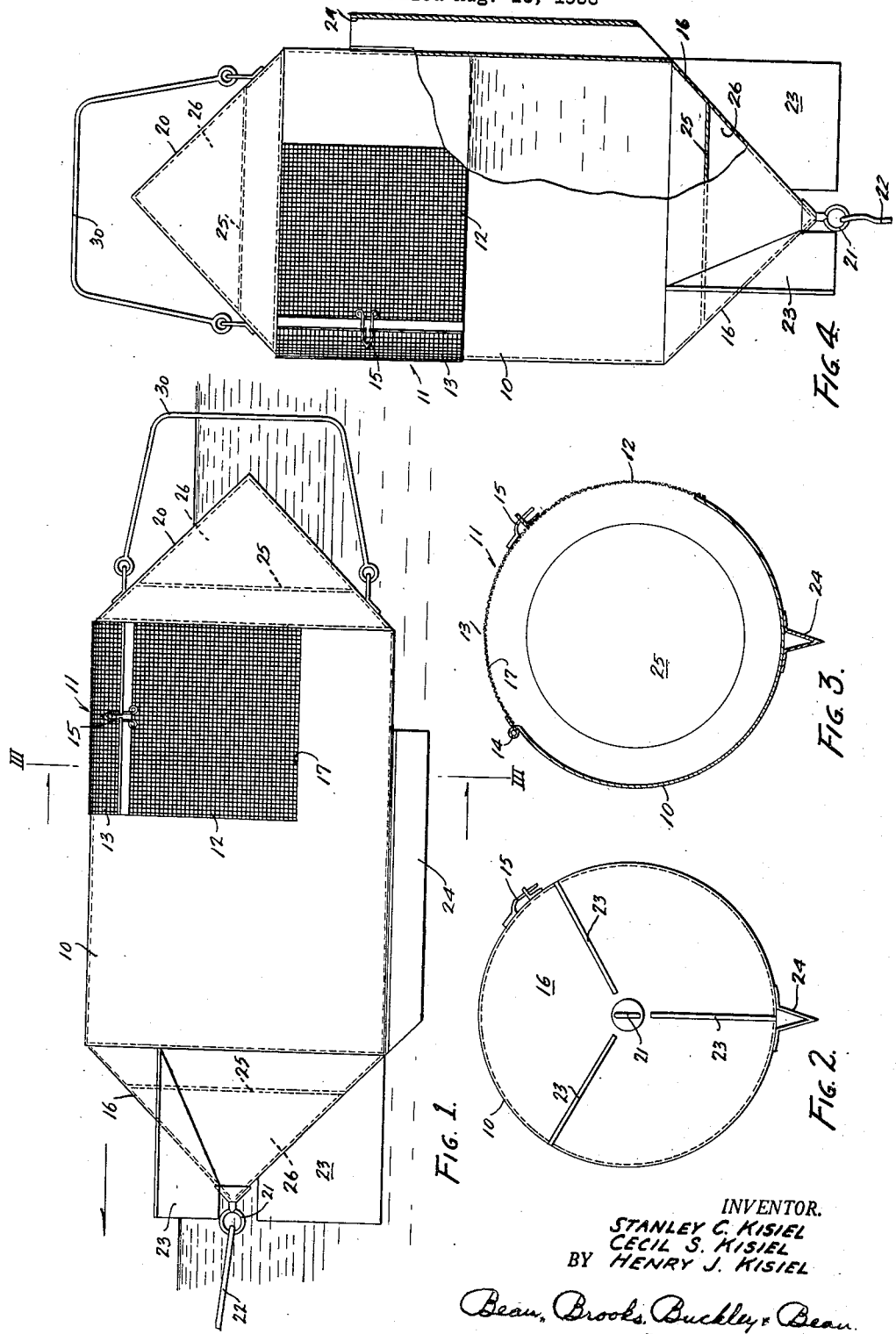
INVENTOR.
STANLEY C. KISIEL
CECIL S. KISIEL
BY HENRY J. KISIEL
Beau, Brooks, Buckley & Beau.
ATTORNEYS

United States Patent Office 2,834,145
Patented May 13, 1958

2,834,145

MINNOW BUCKET

Stanley C. Kisiel, Leicester, and Cecil S. Kisiel and Henry J. Kisiel, Batavia, N. Y., assignors to The Pinnacle Products Company, Batavia, N. Y.

Application August 16, 1956, Serial No. 604,376

2 Claims. (Cl. 43—56)

Our invention relates in general to fishing paraphernalia and in particular to a minnow bucket.

The principal object of our invention is to provide a bucket which can be towed behind a vessel while containing bait.

Another object is to provide a bucket which is so constructed that while being towed the minnows contained therein will not be injured by movement of the device through the water.

A further object is to provide a bucket having a keel whereby it will be prevented from spinning on its horizontal axis while being towed.

Moreover, our invention is provided with a built-in enclosed air chamber at each end to maintain the bucket afloat in a body of water.

Another object is to provide a bucket which may be rested upon a supporting surface in a vertical position when not being used.

A further object is to provide a device with a handle at one end by which it may be carried, and to so position the screen opening in the body that an adequate quantity of water will remain in the bucket when turned to a vertical position.

Moreover, our device is fully enclosed and provided with a screened opening so located that when the device is in its horizontal position the surrounding water may circulate therethrough.

The above objects and advantages have been accomplished by the device shown in the accompanying drawings, of which:

Fig. 1 is a side elevation of the device in the position occupied when being towed;

Fig. 2 is an end elevation of our device;

Fig. 3 is a sectional view of our invention in its towing position and is taken on line III—III of Fig. 1; and Fig. 4 is a side elevation of the device when being carried or when resting upon a supporting surface.

Our device comprises a body 10 of round cross section, said body being formed with an access opening 17 covered by a foraminous screen 11 preferably of wire mesh consisting of a stationary part 12, and a pivoted part 13. The pivoted part is hinged to said body at 14 and a latch 15 of any suitable type is provided for releasably fastening this screen part in its closed position.

The body may be provided with convex ends 16 and 20, preferably of cone shape, whereby the bucket may readily move through the water as it is being towed. The end 16 is provided with an eye 21 to which a towing line 22 will be attached when the bucket is being towed. The head 16 is provided with a plurality of outwardly extending fins 23 which not only act as stabilizers for keeping the body from spinning but which also provide feet upon which the device may be rested when in a vertical position. The body is provided with a keel 24 which extends longitudinally thereof and which is located at the bottom of the body when floating in the water, thereby aiding in keeping the body from spinning.

A bulkhead 25 is disposed in each head and spaced from the outer end thereof, thereby providing float chambers 26 which support the device upon the water when in towing position.

A handle or bail 30 is pivotally attached to the head 20, whereby the bucket may be lifted from the position shown in Fig. 1 and supported while being carried or while being placed upon a supporting surface.

It will be obvious from the foregoing that since the lower end of the stationary part 12 of the screen 11 is submerged in the water when being towed as shown in Fig. 1, there will be a circulation of fresh water through the body. When the device is lifted from the water, by means of the bail 30 and suspended therefrom or when rested upon the fins 23 the screened opening will be located at the top of the body, thereby retaining sufficient water in the body for the minnows.

While we have shown a wire mesh screen for closing the opening in the body, the body may be formed with perforations to provide for circulation of water and the hinged cover part may be of screening or be perforated as desired. These and other modifications of the details herein shown and described may be made without departing from the spirit of our invention or the scope of the appended claims.

What is claimed is:

1. A minnow bucket comprising an enclosed body having front and rear ends, a convex head at each end of said body, an airtight bulkhead formed in each head for supporting said body upon the surface of a body of water, said body being formed with an access opening formed in the rear end thereof and being so positioned that a portion only of said opening will be submerged when the device is supported in its horizontal position, a screen for covering said opening, said screen being formed with a stationary part extending over the submerged portion of said opening and a pivotally mounted portion extending over the unsubmerged portion of said opening, means for detachably fastening said pivotal portion in place, and a plurality of longitudinally disposed fins carried by the front end of said body and equidistantly spaced thereon, said fins extending forwardly in axial direction and having their forward edges lying in a plane substantially normal to the longitudinal axis of said body thus providing feet for supporting said body in vertical position when resting upon a horizontal surface.

2. A minnow bucket comprising an enclosed body having front and rear ends, a convex head at each end of said body, an airtight bulkhead formed in each head for supporting said body upon the surface of a body of water, said body being formed with an access opening formed in the rear end thereof and being so positioned that a portion only of said opening will be submerged when the device is supported in its horizontal position, a screen for covering said opening, said screen being formed with a stationary part extending over the submerged portion of said opening and a pivotally mounted portion extending over the unsubmerged portion of said opening, means for detachably securing said pivotal portion in place, a plurality of longitudinally disposed fins carried by the front end of said body and equidistantly spaced thereon, said fins extending outwardly in axial direction and having their outer edges lying in a plane substantially normal to the longitudinal axis of said body thus providing feet for supporting said body in vertical position when resting upon a horizontal surface, a towing ring at the front end of said body, and a bale at the rear end of said body.

References Cited in the file of this patent

UNITED STATES PATENTS

| | | |
|---|---|---|
| 807,875 | Shinners | Dec. 19, 1905 |
| 1,542,404 | Paulson | June 16, 1925 |
| 1,934,815 | Parrott | Nov. 14, 1933 |
| 2,111,959 | Baxter | Mar. 22, 1938 |
| 2,711,610 | Miller | June 28, 1955 |